United States Patent [19]
Ferrante

[11] Patent Number: 4,687,282
[45] Date of Patent: Aug. 18, 1987

[54] METHOD AND APPARATUS FOR MAKING AND UTILIZING A HOLOGRAPHIC BIFOCAL LENS ELEMENT

[75] Inventor: Ronald A. Ferrante, Senecaville, Ohio

[73] Assignee: NCR Corporation, Dayton, Ohio

[21] Appl. No.: 727,309

[22] Filed: Apr. 25, 1985

[51] Int. Cl.$^4$ .............................................. G02B 5/32
[52] U.S. Cl. .................................. 350/3.7; 350/3.72
[58] Field of Search ................................ 350/3.7–3.72, 350/3.73; 356/342

[56] References Cited

U.S. PATENT DOCUMENTS

| | | | |
|---|---|---|---|
| 3,578,838 | 5/1971 | Hallock | 350/3.5 |
| 3,675,990 | 7/1972 | Kogelnik et al. | 350/311 |
| 3,807,829 | 4/1974 | Close | 350/3.5 |
| 4,245,882 | 1/1981 | Chang | 350/3.72 |
| 4,253,723 | 3/1981 | Kojima et al. | 350/3.72 |
| 4,333,006 | 6/1982 | Gorin et al. | 235/457 |
| 4,421,379 | 12/1983 | Grumet et al. | 350/3.72 |

Primary Examiner—Bruce Y. Arnold
Attorney, Agent, or Firm—Wilbert Hawk, Jr.; Albert L. Sessler, Jr.; Richard W. Lavin

[57] ABSTRACT

A laser system, and method therefor, is disclosed which uses a single holographic bifocal lens element, comprised of non-overlapping first and second holographic lenses, to perform a plurality of different functions in the system. The field lens converges and focuses the first reconstructed beam on a desired target. Light reflected from the target back to the second holographic lens causes that lens to generate and focus a second reconstructed beam at a collection point. The holographic bifocal lens element is fabricated by initially producing a lenslet holographically by recording the interference of two point sources on a first portion of the same side of a hologram recording medium and then producing a collection lens holographically by recording the interference of two point sources on opposite sides of the hologram recording medium.

27 Claims, 5 Drawing Figures

METHOD AND APPARATUS FOR MAKING AND UTILIZING A HOLOGRAPHIC BIFOCAL LENS ELEMENT

BACKGROUND OF THE INVENTION

1. Field of the Invention.

The present invention relates to holographic lenses and more particularly to a laser system which uses a holographic bifocal lens element.

2. Description of the Prior Art.

Laser systems are being utilized in ever-increasing applications to send a laser beam out and measure (in some desired manner) the retroreflected signal off some target. Examples of such applications are in the fields of laser scanners and laser range finders.

In many applications the optical system of a laser system must perform several distinct functions for efficient laser system operation. These functions include laser beam divergence/collimation/focusing, filtering background noise from the reflected signal light, and collection light focusing on a detector. Typically, these functions are performed by combinations of cold mirrors, lenses, and a colored plastic filter (or dyed color lens).

An optical system which includes a combination of cold mirrors, lenses and a colored plastic filter (or dyed color lens) can present a substantially wide bandwidth of about 1500 angstroms to light reflected from a target. Such a wide bandwidth also passes too much external overhead light (in the form of noise) through the optical system to the detector, thereby degrading the performance of the laser system.

The background art known to applicant at the time of the filing of this application is as follows:

U.S. Pat. No. 3,578,838, Multiple Hologram Recording and Read Out System, by J. N. Hallock;

U.S. Pat. No. 3,675,990, Reflective-Type Narrow Bank Filter, by H. W. Kogelnik et al.;

U.S. Pat. No. 3,807,829, Extented-Field Holographic Lens Arrays, by D. H. Close;

U.S. Pat. No. 4,245,882, Doubly Modulated On-Axis Thick Hologram Optical Element, by B. J. Chang;

U.S. Pat. No. 4,421,379, Multiple Holographic Lens, by A. Grumet et al.; and

U.S. Pat. No. 4,333,006, Multifocal Holographic Scanning System, by B. A. Gorin et al.

None of the above-cited prior art patents teaches or suggests a laser system which utilizes a single holographic bifocal lens element to perform all of the functions typically performed by an exemplary combination comprised of a cold mirror, lenses (a bifocal lens) and a color filter (or color lens).

SUMMARY OF THE INVENTION

Briefly, a laser system is provided which utilizes a single holographic bifocal lens element to perform such exemplary functions as laser beam divergence/collimation/focusing, filtering background noise from the reflected signal light, collecting reflected light into a collection light beam and focusing that collection light onto a detector in the laser system for signal detection and utilization. The holographic bifocal non-overlapping lenses selectively formed on a single hologram recording medium.

In accordance with a first aspect of the invention, there is provided an apparatus for scanning a bar code label comprising, in combination, a source of a coherent radiant energy beam, said source having an operating frequency; a holographic bifocal disc member positioned adjacent the source of radiant energy beams including a first holographic lens located at its center and receiving the coherent radiant energy beams for generating and transmitting first reconstructed beams of radiant energy along a first path, said disc member further including a second holographic lens surrounding said first holographic lens in a non-overlapping relationship, said second holographic lens substantially filtering out all frequencies of radiant energy incident thereon except for a relatively narrow spectral bandpass centered around the operating frequency of said source, scanning means mounted in said first path for directing said first reconstructed beams in a scanning pattern at a bar code label positioned in a preselected region, said bar code label reflecting the scanning beams back towards said scanning means which directs the reflected scanning beams toward said second holographic lens, said second holographic lens being responsive to the scanning beams reflected from the bar code label for generating and focusing second reconstructed beams of radiant energy at a collection point, and means positioned at the collection point for extracting desired information from said second reconstructed beams.

In accordance with a second aspect of the invention, there is provided a method for making a holographic bifocal lens element, said method comprising the steps of: recording on a first portion of a hologram recording medium a first interference pattern produced by the interference between first and second mutually coherent beams of radiant energy having a predetermined operating frequency and which are directed to the first portion from the same side of the hologram recording medium to form a first holographic lens for transmitting and focusing the beams of radiant energy at a first focal point; recording on a second portion of the hologram recording medium a second interference pattern produced by the interference between third and fourth mutually coherent beams of radiant energy having a relatively narrow spectral bandpass centered around said predetermined operating frequency of said first and second mutually coherent beams of radiant energy and which are directed to the second portion from opposite sides of the hologram recording medium to form a second holographic lens which focuses reflected incident beams of radiant energy at a second focal point; and developing the hologram recording medium to produce the holographic bifocal lens element.

BRIEF DESCRIPTION OF THE DRAWINGS

Various objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
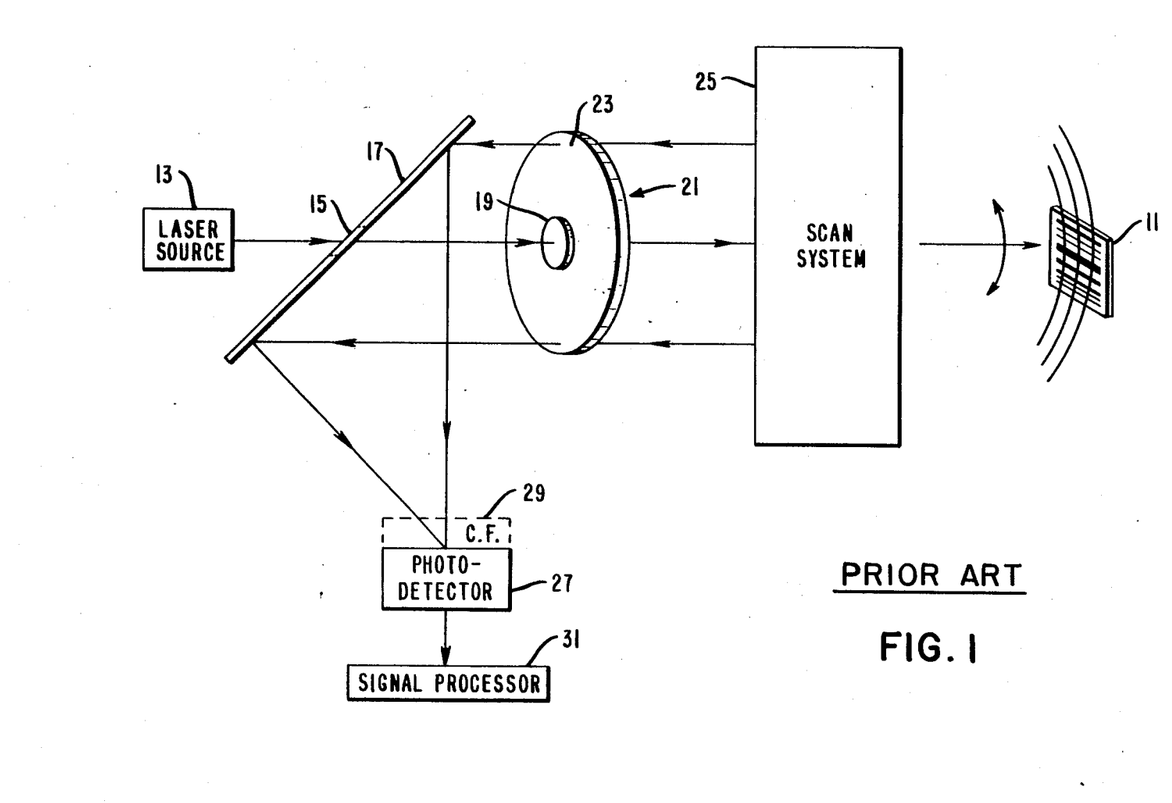
FIG. 1 is a schematic block diagram of a prior art laser scanner.

Referring now to the drawings, FIG. 1 is a schematic block diagram of a prior art universal product code (UPC) laser scanner which is used to read a UPC bar code printed on a UPC label or tag on a merchandised item (not shown) at a point-of-sale terminal, such as a grocery check-out counter. The laser scanner uses a laser source 13, such as a 1 milliwatt helium-neon laser, to direct a scan beam or light beam through a hole 15 cut in a cold mirror 17 to a lenslet 19 of a bifocal lens 21. This bifocal lens 21 is a conventional refractive element which includes the lenslet 19 superimposed over a portion of large outer lens 23 (to be discussed). The lenslet 19 is adapted to bring the scan beam from the laser source 13 to focus on a UPC tag 11.

Interposed between the bifocal lens 21 and the tag 11 is a conventional scan system 25 comprised of a suitable assembly of lenses and moving and fixed mirrors (not shown). Examples of such a scan system 25 may be found in U.S. Pat. Nos. 3,973,826; 4,025,761; and 4,333,006. The scan system 25 moves the focused beam around in space so that it produces a scan of a volume in space. By this means a tag 11 on a merchandised item (not shown), that is passed through that volume in space, is scanned by scan lines from the scan system 25. As is well known in the art, the UPC bar code on the tag 11 comprises a plurality of light and dark bars which, when scanned by the scan system 25, will generate a specific pulse train waveform.

When the focused beam from the scan system 25 strikes the UPC bar code on the tag 11, the focused beam is reflected and diffusely scattered. Reflected signal light from the tag 11 returns to the scan system 25. The scan system 25 acts as a window or aperture that allows that returned reflected light to pass through the scan system 25 to the bifocal lens 21. Thus, the scan system 25 acts as a limiting aperture to such reflected light from the tag 11.

Reflected light, or collection light, from the scan system 25 strikes the large outer lens 23 of the bifocal lens 21. The lens 23 is adapted to bring this collection light through a filter 29 to focus on a photodetector 27 by way of the cold mirror 17. No filtering is performed by the lens 23. The cold mirror 17 collects the collection light from the lens 23. In addition, the cold mirror 17 has a cut-off frequency just above the operating wavelength of the laser source 13. As a result, the cold mirror 17 also filters out long wavelength light and only reflects toward the detector 27 collection light having a shorter wavelength than that of its own cut-off frequency.

Mounted over the photodetector 27 is a color filter (C.F.) 29 which only passes to the photodetector 27 light having a wavelength above a value determined by the color filter 29. This point is preselected below the wavelength of the light from the laser source 13. Shorter wavelength light, such as visible light, is blocked by the color filter 29. Thus, a bandpass of light centered around the wavelength of the laser light is passed by the combination of the cold mirror 17 and color filter 29 to the photodetector 27. The spectral bandwidth of the combination of the cold mirror 17 and color filter 29 is substantially wide, typically about 1500 angstroms. Such a combination therefore passes an excessive amount of noise light to the photodetector 27.

In lieu of the color filter 29, a dyed-color lens (such as a red-dyed meniscus lens) or a combination of a color filter and dyed-color lens could be used.

The photodetector 27 generates an electrical signal proportional to the changing intensity level of the tag-reflected light being focused thereon. This electrical signal, which rises and falls with respect to time, is then fed to a signal processor 31. The signal processor 31 amplifies, shapes and decodes this electrical signal to determine what the UPC bar code on the tag 11 means.

Figure 2:
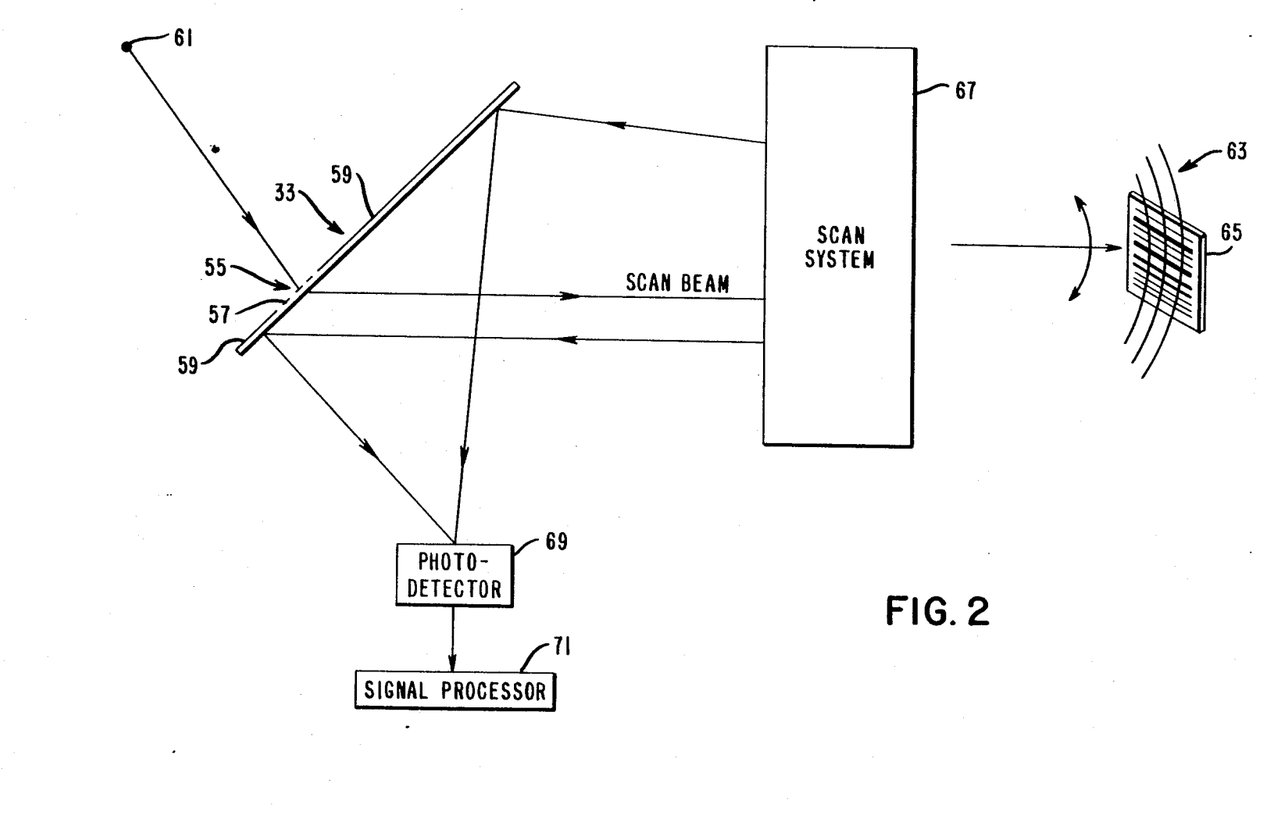
FIG. 2 is a schematic block diagram of a laser scanner which utilizes a holographic bifocal lens element in accordance with a first embodiment of the invention.

FIG. 2 is a schematic block diagram of a laser scanner which utilizes a single holographic bifocal filter lens element 33 in accordance with a first embodiment of the invention. The holographic bifocal filter lens element 33 replaces the combination of the cold mirror 17, bifocal lens 21 and color filter 29 shown in FIG. 1 and performs the same functions performed by that combination of elements. Before explaining the operation of the laser scanner of FIG. 2, reference will now be made to FIGS. 3A and 3B to show how the holographic bifocal filter lens element 33 of FIG. 2 is made.

Figure 3A:
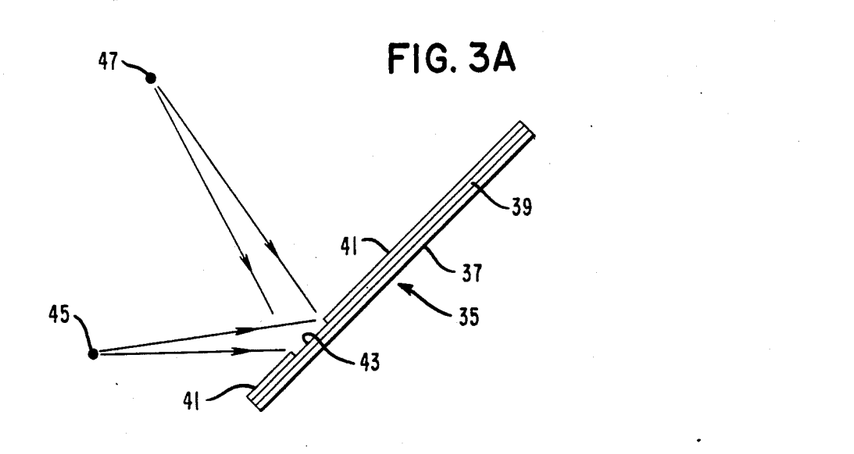
FIG. 3A and 3B illustrate how the holographic bifocal lens element of FIG. 2 is made.

FIG. 3A shows the recording of a holographic lenslet or scan element on a photosensitive plate 35. The photosensitive plate 35 can consist of a glass substrate 37 and a photosensitive emulsion or film 39, such as dichromated gelatin, photoresist or silver halide gelatin, on one surface of the glass substrate 37.

The photosensitive film 39 is masked off by a suitable mask 41, except for a very small area 43 of the film 39. Through that small unmasked area 43 an interference pattern or hologram of fringes is produced from the interference of two mutually coherent point sources respectively called an object source 45 and a reference source 47. That interference pattern sets up a stable standing wave pattern of bright and dark fringes that induces a photo-chemical change in the unmasked photosensitive film 39 in the area 43. Thus, the interference pattern or hologram is recorded on the photosensitive film 39 to produce a holographic lenslet or scan element on the photosensitive plate 35 in the area 43. This holographic lenslet is a "transmission" type of holographic lens.

Figure 3B:
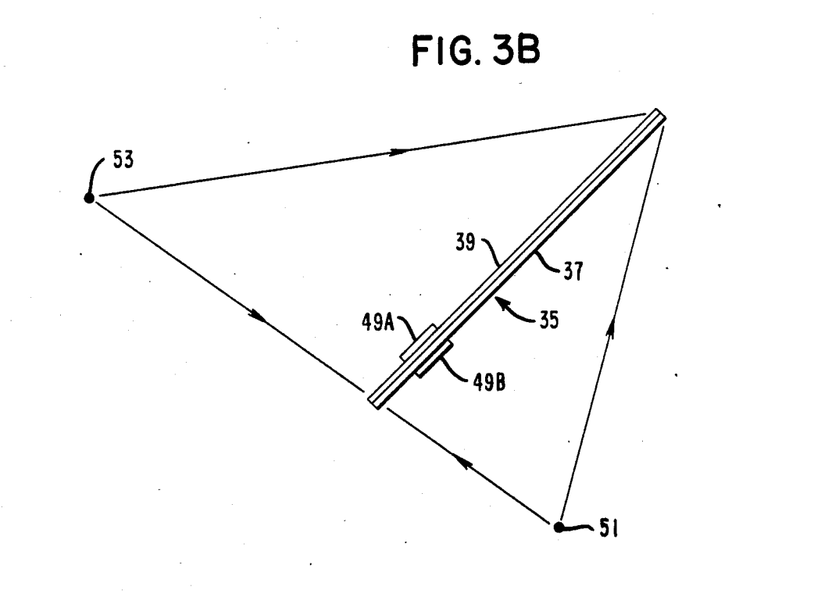

FIG. 3B shows the recording of a holographic collection lens on the photosensitive plate 35. As shown in FIG. 3B, only that portion of the photosensitive film 39 that was recorded on in the area 43 in FIG. 3A is masked off by masks 49A and 49B located on opposite sides of the plate 35.

The remaining unmasked portion of the photosensitive film 39 is illuminated by light from mutually coherent object and reference point sources 51 and 53, respectively located on opposite sides of the photosensitive plate 35. The interference pattern or hologram produced by the interference of these point sources 51 and 53 is recorded on the film 39 to produce a holographic collection lens, which is a "reflection" type of holographic lens. The masks 49A and 49B are then removed.

After the holographic lenslet and holographic collections lens are selectively recorded on the plate 35 in the two steps shown in FIGS. 3A and 3B, the unmasked, exposed photosensitive plate 35 is chemically processed in a manner well known to those skilled in the art. The resultant holographic bifocal filter lens element 33 (FIG. 2) is therefore comprised of two non-overlapping holographic lenses on one plate 35, namely a small holographic lenslet or scan lens which is "transmissive" and a large holographic collection lens which is "reflective".

Referring back to FIG. 2, the single holographic bifocal filter lens element 33 is the diffractive or holographic equivalent of the refractive bifocal lens 21 of FIG. 1. The element 33 is comprised of a relatively small holographic lenslet or scan lens 55 (designated by dashed line 57) surrounded by a relatively large holographic collection lens 59. The holographic lenslet 55 is transmissive to incident light, whereas the holographic collection lens 59 is reflective to incident light. It should also be noted that each of the holographic lenslet 55 and holographic collection lens 59 can be constructed to diverge, converge or collimate a light beam, depending on the particular operation that is desired.

In the operation of the laser scanner of FIG. 2, a laser point source 61 directs a light beam to the holographic lenslet 55. In response to this light beam from the point source 61, the holographic lenslet 55 generates a reconstructed scan beam. The lenslet 55 also brings this scan beam to focus on a preselected target region 63 through which a UPC tag 65 is passed.

Interposed between the holographic bifocal filter lens element 33 and the target region 63 is a conventional scan system 67 similar to the scan system 25 in FIG. 1. The scan system 67 further focuses the scan beam on the target region 63 and also scans the focused scan beam across the UPC bar code on any UPC tag 65 passing through the target region 63.

Reflected light, or collection light, reflected from the UPC tag 65 passes through the scan system 67 to the holographic bifocal filter lens element 33. Only a small portion of the collection light passes through the transmission lenslet 55 and is dissipated. The majority of the collection light is collected by the collection lens 59. In response to this collection light incident thereon, the collection lens 59 generates and focuses a reconstructed or diffracted light beam onto a photodetector 69.

In addition to operating as a lens to focus the reconstructed light beam onto the photodetector 69, the holographic collection lens 59 also operates as an interference filter. It will be recalled that the holographic collection lens is "reflective". However, the lens 59 has a relatively narrow spectral bandpass centered around the operating light frequency of the point source 61. It substantially reflects only that one frequency of light. As a result, the holographic collection lens 59 filters out all light incident thereon except for that very narrow spectral bandpass centered around the light frequency of the point source 61. Thus, all overhead lighting is filtered out and substantially only the retroreflected light originating from the point source 61 is focused onto the photodetector 69. The spectral bandwidth of the holographic lens 59 is approximately 112 angstroms. This is a considerable improvement over the typical 500 angstrom spectral bandwidth of the prior art combination of the cold mirror 17 and color filter 29 previously discussed in relation to FIG. 1.

The photodetector 69 generates an electrical signal proportional to the changing intensity level of the reflected light from the tag 65 that is being focused on the photodetector 69. This electrical signal, which rises and falls with respect to time, is fed to a signal processor 71. The signal processor 71 amplifies, shapes and decodes this electrical signal to determine what the UPC bar code on the tag 65 means.

It has therefore been shown that the single holographic bifocal filter lens element 33, when used in the laser scanner of FIG. 2, performs the three functions of a scan lens, a collection lens and an interference filter for efficient scanner operation. More specifically, the holographic lenslet 55 of the element 33 performs a scan beam divergence (or convergence or collimation) and a focusing function, and the holographic collection lens 59 filters background noise from the retro-reflected signal light, and collects and focuses the collection light on the photodetector 69.

Figure 4:
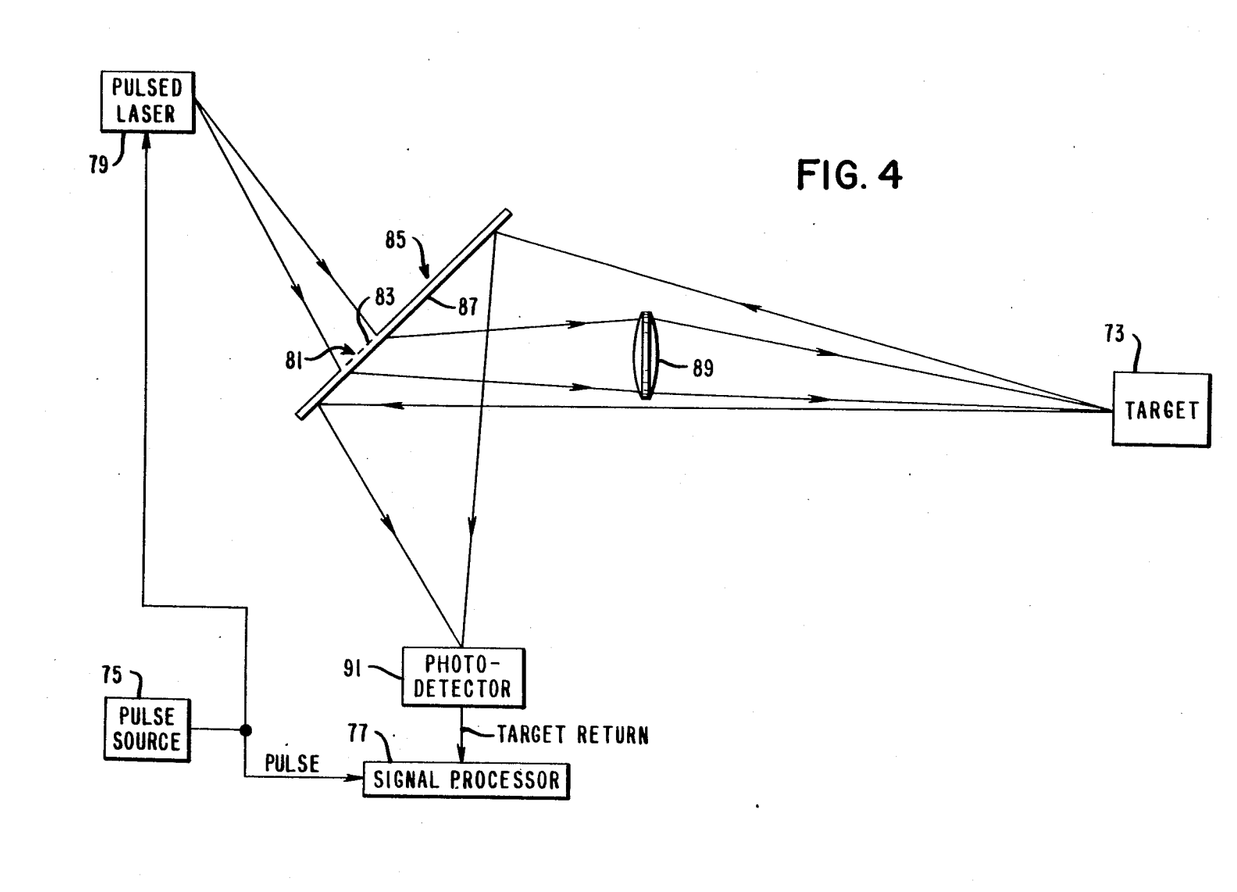
FIG. 4 is a schematic block diagram of a laser range finder which utilizes a holographic bifocal lens element in accordance with a second embodiment of the invention.

Referring now to FIG. 4 a second embodiment of the invention is shown by a schematic block diagram of a laser range finder or distance measuring device which utilizes a holographic bifocal filter lens element.

In a typical laser ranging operation, an operator (not shown) lines up a distant target 73 before causing a pulse source 75 to generate a pulse. This pulse is sent to a signal processor 77 to initiate a timing operation and to a pulsed laser 79 to fire the laser 79. For a typical laser range finder operation, a neodymium ythium aluminum garnet (Nd: YAG) pulsed laser could be used.

In response to the pulse from the pulse source 75, the laser 79 transmits a light beam to a transmissive holographic lenslet 81 (represented by dashed line 83) in a holographic bifocal filter lens element 85. The element 85, which is similar in structure and operation to the element 33 in FIG. 2, also includes a reflective holographic collection lens 87.

It should be noted that each of the holographic lenslet 81 and holographic collection lens 87 (like the corresponding lenses 55 and 59, respectively, in FIG. 2) can be initially constructed to diverge, converge or collimate a light beam. For this particular application, the lenslet 81 is initially constructed to diverge a light beam, whereas the collection lens 87 is constructed to converge a light beam.

In response to the light beam from the pulsed laser 79, the holographic lenslet 81 generates a reconstructed beam. The lenslet 81 also diverges this reconstructed beam to a lens system represented by a field lens 89. The field lens 89 brings this reconstructed beam to focus on the selected distant target 73. Reflected light from the target 73 hits the holographic collection lens 87. The collection lens 87 filters out all light incident thereon except for that very narrow bandpass centered around the operating light frequency of the pulsed laser 79, in a manner similar to that previously described for the collection lens 59 in FIG. 2. That portion of the incident light that is not filtered out by the collection lens 87 is collected and focused by the collection lens 87 onto a photodetector 91 as a reconstructed or diffracted light beam. The photodetector 69 converts the light signal or target echo into an electrical target return signal which is then applied to the signal processor 77.

The signal processor 77 can include a clock generator having a preselected interpulse period, a digital counter, and suitable gating circuitry. In operation, the signal processor 77 is enabled by the pulse from the pulse source 75 start counting clocks from the clock generator and is disabled by the target return signal from counting any further clocks. The digital counter therefore indicates the round-trip time of light between the laser range finder of FIG. 4 and the target 73. As a result, the digital counter can be calibrated to give a direct range reading in meters or miles.

While the salient features of the invention have been illustrated and described in two different embodiments, it should be readily apparent to those skilled in the art that many changes and modifications can be made in the apparatus and methods of the invention presented without departing from the spirit and true scope of the invention. For example, although a laser source has been used in the scanner and range finder embodiments, any other suitable source of a coherent radiant energy beam could have been used instead of the laser source. Accordingly, the present invention should be considered as encompassing all such changes and modifications of the invention that fall within the broad scope of the invention as defined by the claims.

I claim:

1. An apparatus for scanning a bar code label comprising:
   a source of coherent radiant energy beam, said source having an operating frequency;
   a holographic bifocal disc member positioned adjacent the said source including a first holographic lens located at the center of said disk and receiving the coherent radiant energy beam for generating and transmitting a first reconstructed beam of radiant energy along a first path;
   said disc member further including a second holographic lens surrounding said first holographic lens in a non-overlapping relationship, said second holographic lens substantially filtering out all frequencies of radiant energy incident thereon except for a relatively narrow spectral bandpass centered around the operating frequency of said source;
   scanning means mounted in said first path for directing said first reconstructed beam in a scanning patterh at a bar code label positioned in a preselected region, said bar code label reflecting the scanning beam back towards said scanning means which directs the reflected scanning beam toward said second holographic lens;
   said second holographic lens being responsive to the scanning beam reflected from the bar code label for generating and focusing a second reconstructed beam of radiant energy at a collection point; and
   means positioned at the collection point for extracting desired information from said second reconstructed beam.

2. The apparatus of claim 1 wherein said holographic bifocal disc member comprises:
   a hologram recording medium and first and second non-overlapping holograms on said hologram recording medium, said first hologram comprising a recording of a first interference pattern formed by the interference between first and second mutually coherent beams of radiant energy having a predetermined operating frequency and which are directed to a first part of said recording medium from the same side of said recording medium to form said first holographic lens, and said second hologram comprising a recording of a second interference pattern formed by the interference between third and fourth mutually coherent beams of radiant energy having a relatively narrow spectral bandpass centered around said predetermined operating frequency of said first and second mutually coherent beams of radiant energy and which are directed to a second part of said recording medium from opposite sides of said recording medium to form said second holographic lens.

3. The apparatus of claim 2 wherein said first holographic lens also focuses said first reconstructed beam at the preselected region.

4. The apparatus of claim 1 wherein:
   said directing means includes a scan system for scanning any target passing through the preselected target region and for allowing some of the radiant energy reflected from a target to pass through said scan system to said second holographic lens; and
   said extracting means detects changes in said second reconstructed beam caused by changes in the radiant energy reflected from the target.

5. The apparatus of claim 4 wherein:
   said second holographic lens substantially filters out all frequencies of radiant energy incident thereon except for a relatively narrow spectral bandpass centered around the operating frequency of said source.

6. The apparatus of claim 5 wherein:
   said first holographic lens also focuses said first reconstructed beam at the preselected target region.

7. The apparatus of claim 4 wherein said holographic bifocal element comprises:
   a hologram recording medium and first and second non-overlapping holograms on said hologram recording medium, said first hologram comprising a recording of a first interference pattern formed by the interference between first and second mutually coherent beams of radiant energy directed to a first part of said recording medium from the same side of said recording medium to form said first holographic lens, and said second hologram comprising a recording of a second interference pattern formed by the interference between third and fourth mutually coherent beams of radiant energy directed to a second part of said recording medium from opposite sides of said recording medium to form said second holographic lens.

8. The apparatus of claim 7 wherein said hologram recording medium comprises:
   a glass layer; and
   a photosensitive layer disposed on said glass layer for recording said first and second holograms thereon.

9. The apparatus of claim 7 wherein:
   said first holographic lens is a transmission-type holographic lens; and
   said second holographic lens is a reflection-type holographic lens.

10. The apparatus of claim 9 wherein:
    said source is a laser.

11. The apparatus of claim 1 wherein:
    said source of a coherent radiant energy beam is a pulsed laser for emitting a pulsed radiant energy beam;
    said directing means includes a field lens for focusing said first reconstructed beam on a target in said preselected target region;
    said extracting means includes a pulse source for periodically supplying a pulse to fire said pulsed laser, a detector for converting each second reconstructed beam into a return signal, and means for measuring the time between a pulse and its associated return signal to determine the range of the target from said apparatus.

12. The apparatus of claim 11 wherein:
    said second holographic lens substantially filters out all frequencies of radiant energy incident thereon except for a relatively narrow spectral bandpass centered around the operating frequency of said source.

13. The apparatus of claim 11 wherein said holographic bifocal element comprises:
a hologram recording medium and first and second non-overlapping holograms on said hologram recording medium, said first hologram comprising a recording of a first interference pattern formed by the interference between first and second mutually coherent beams of radiant energy directed to a first part of said recording medium from the same side of said recording medium to form said first holographic lens, and said second hologram comprising a recording of a second interference pattern formed by the interference between third and fourth mutually coherent beams of radiant energy directed to a second part of said recording medium from opposite sides of said recording medium to form said second holographic lens.

14. The apparatus of claim 13 wherein said hologram recording medium comprises:
a glass layer; and
a photosensitive layer disposed on said glass layer for recording said first and second holograms thereon.

15. The apparatus of claim 13 wherein:
said first holographic lens is a transmission-type holographic lens; and
said second holographic lens is a reflection-type holographic lens.

16. A method for utilizing a holographic bifocal lens element which includes non-overlapping first and second holographic lenses, said method comprising the steps of:
providing a coherent light beam to illuminate the first holographic lens;
generating a first reconstructed light beam from the coherent light beam illuminating the first holographic lens;
directing the first reconstructed light beam to a target in a preselected target region to cause light to be reflected from the target to the second holographic lens;
generating a first reconstructed light beam from light that is reflected from the target to the second holographic lens;
focusing the second reconstructed light beam at a collection point; and
extracting desired information from the second reconstructed light beam being focused at the collection point.

17. The method of claim 16 including between the directing step and the step of generating a first reconstructed light beam the further step of:
filtering out all frequencies of light incident on the second holographic lens except for a relatively narrow spectral bandpass centered around the operating frequency of the coherent light beam.

18. The method of claim 16 including between the directing step and the step of generating a first reconstructed light beam the further step of:
focusing the first reconstructed light beam at the preselected target region.

19. The method of claim 16 wherein said directing step includes the steps of:
scanning the first reconstructed light beam onto any target passing through the preselected target region; and allowing some of the light that is reflected from the target to pass to the second holographic lens.

20. The method of claim 19 including between the allowing step and the step of generating a first reconstructed light beam the further step of:
filtering out all frequencies of light incident on the second holographic lens except for a relatively narrow spectral bandpass centered around the operating frequency of the coherent light beam.

21. The method of claim 19 wherein said extracting step includes the step of:
detecting intensity changes in the second reconstructed light beam.

22. The method of claim 16 wherein said directing step includes the step of:
focusing the first reconstructed light beam on a target in the preselected target region.

23. The method of claim 22 wherein:
said providing step includes the step of developing a pulsed coherent light beam to illuminate the first holographic lens; and
said extracting step includes the step of measuring the time between when a pulsed coherent light beam is developed and when the second reconstructed light beam is focused at a collection point in order to determine the range of a target.

24. A method for making a holographic bifocal lens element, said method comprising the steps of:
recording on a first portion of a hologram recording medium a first interference pattern produced by the interference between first and second mutually coherent beams of radiant energy having a predetermined operating frequency which are directed to the first portion from the same side of the hologram recording medium to form a first holographic lens for transmitting and focusing a beam of radiant energy at a first focal point;
recording on a second portion of the hologram recording medium a second interference pattern produced by the interference between third and fourth mutually coherent beams of radiant energy having a relatively narrow spectral bandpass centered around the predetermined operating frequency of said first and second mutually coherent beams of radiant energy and which are directed to the second portion from opposite sides of the hologram recording medium to form a second holographic lens which focuses a reflected incident beam of radiant energy at a second focal point; and
developing the hologram recording medium to produce the holographic bifocal lens element.

25. The method of claim 24 further including the steps of:
masking the second portion before recording on the first portion;
unmasking the second portion after recording on the first portion;
masking the first portion before recording on the second portion; and
unmasking the first portion before developing the hologram recording medium.

26. The method of claim 34 including before the step of recording on the first portion the further step of:
preselectively locating the first and second portions so that non-overlapping first and second holographic lenses are formed in the recording steps.

27. A method for making a holographic bifocal lens element, said method comprising the steps of:

recording on a first portion of the hologram recording medium a first interference pattern produced by the interference between first and second mutually coherent beams of radiant energy directed to the first portion from the same side of the hologram recording medium to form a first holographic lens for focusing a transmitted beam of radiant energy at a first focal point;

recording on a second portion of the hologram recording medium a second interference pattern produced by the interference between third and fourth mutually coherent beams of radiant energy directed to the second portion from opposite sides of the hologram recording medium to form a second holographic lens which focuses a reflected beam of radiant energy at a second focal point;

preselectively locating the first and second portions so that the second holographic lens is formed to surround without overlapping the first holographic lens; and developing the hologram recording medium to produce the holographic bifocal lens element.

* * * * *

UNITED STATES PATENT AND TRADEMARK OFFICE
CERTIFICATE OF CORRECTION

PATENT NO. : 4,687,282
DATED : August 18, 1987
INVENTOR(S) : Ronald A. Ferrante

It is certified that error appears in the above—identified patent and that said Letters Patent is hereby corrected as shown below:

Column 7, line 33, delete "patterh" and substitute --pattern--.

Signed and Sealed this

Eighth Day of March, 1988

*Attest:*

DONALD J. QUIGG

*Attesting Officer*    *Commissioner of Patents and Trademarks*